United States Patent [19]

Jost

[11] 4,225,044
[45] Sep. 30, 1980

[54] SLIDE FRAMES AND A SLIDE MAGAZINE FOR STORING SUCH SLIDE FRAMES

[75] Inventor: Jochen Jost, Essen, Fed. Rep. of Germany

[73] Assignee: AGFA-Gevaert, A.G., Leverkusen, Fed. Rep. of Germany

[21] Appl. No.: 30,142

[22] Filed: Apr. 16, 1979

[30] Foreign Application Priority Data

Apr. 19, 1978 [DE] Fed. Rep. of Germany ....... 2817005

[51] Int. Cl.$^3$ ..................... B65D 85/62; G09F 11/30; B65D 5/50
[52] U.S. Cl. .................................. 206/456; 217/65; 40/513
[58] Field of Search ............... 206/449, 456, 454, 455; 217/65; 40/513

[56] References Cited

U.S. PATENT DOCUMENTS

| 2,931,116 | 4/1960 | Boughton et al. | 206/454 |
| 3,045,816 | 7/1962 | King | 206/456 |
| 3,081,870 | 3/1963 | Plettner | 206/456 |
| 4,015,716 | 4/1977 | Nichols | 217/65 |

Primary Examiner—William T. Dixson, Jr.
Attorney, Agent, or Firm—Michael J. Striker

[57] ABSTRACT

A slide magazine for storing slide frames having an edge portion of a predetermined configuration, includes a housing having a bottom surface which is provided with formations operative for holding slide frames in the housing. The formations are shaped so as to matingly complement the configuration of the edge portion of the slide frames to thereby prevent the latter from falling out of the housing. The distance between two adjacent formations as considered lengthwise of the bottom surface corresponds to the thickness of the slide frames to be installed on the slide magazine. Thus, an overall length of a set of the slide frames filling the magazine corresponds to the length of the bottom surface so that the slide magazine requires substantially no more space than the set of slide frames in it.

36 Claims, 13 Drawing Figures

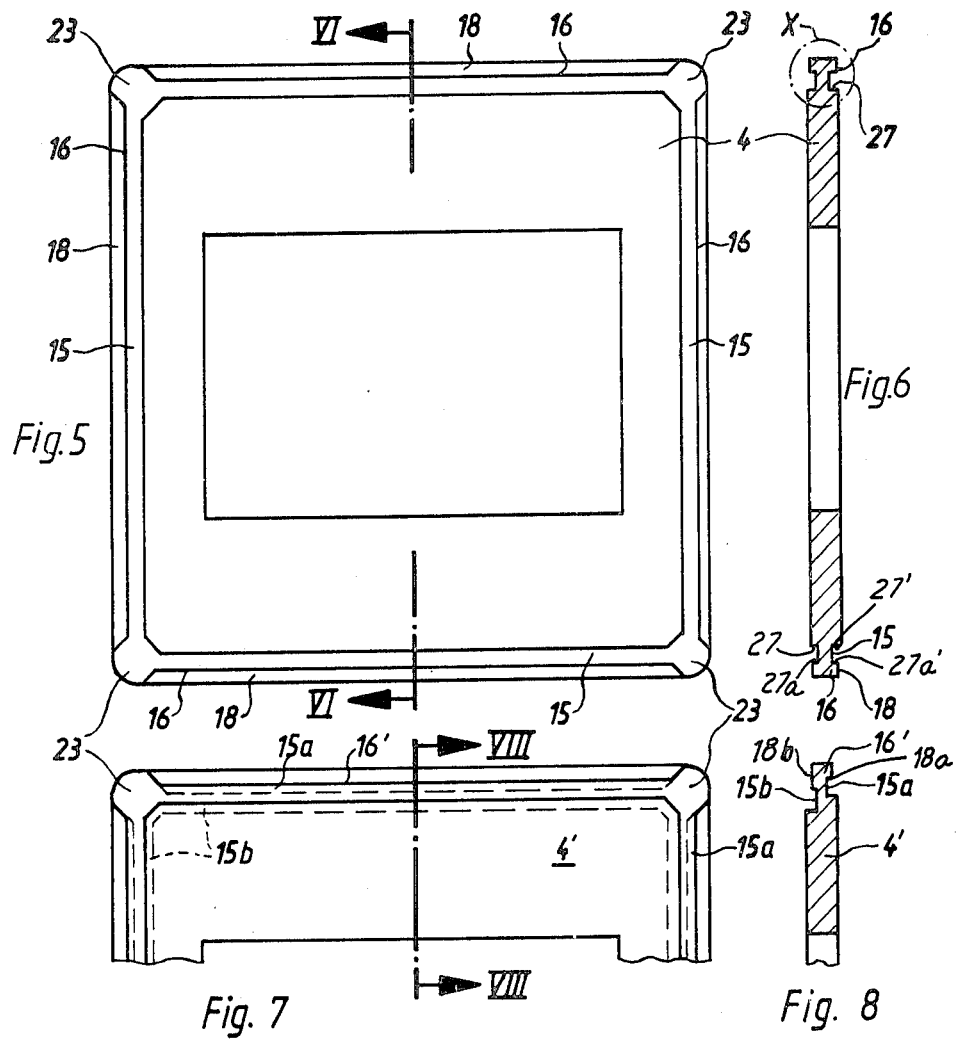
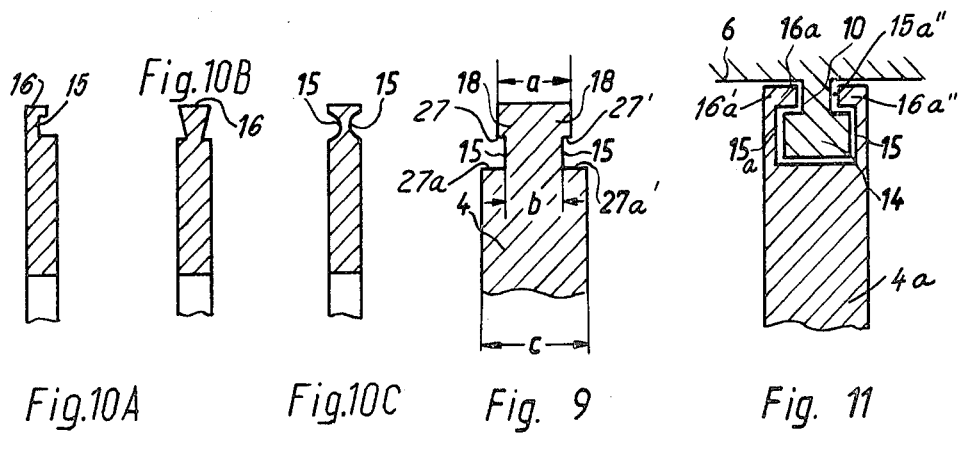

SLIDE FRAMES AND A SLIDE MAGAZINE FOR STORING SUCH SLIDE FRAMES

BACKGROUND OF THE INVENTION

The present invention relates to slide frames and a slide magazine for storing such slide frames.

It is known to provide slide magazines for storing and for charging slides into a projector. These slide magazines usually require considerable space.

Such a known slide magazine includes a housing having an interior which is subdivided, according to the indexing steps of conventional magazine projectors, into a plurality of compartments. Each compartment receives a slide. Thus, for example, if the indexing step of the projector is 5.2 mm each compartment may receive a slide having a thickness of up to 3.2 mm. The compartments are separated from one another by side walls.

Thus, the slide magazine requires a substantial space which includes useful space for the slide frames in the slide magazine and useless space for the side walls. The space required by the known slide magazines is substantially larger than that required for just the slide frames in such a slide magazine.

Thus, for example, for accommodating of 36 slides which together can take up at utmost (in the care of extra-thick slides) only 288cm$^3$ of space, one needs a slide magazine which requires as much as 630 cm$^3$ of space. The relation between the space required for accommodation of the slides perse and the space of the conventional slide magazine for this purpose becomes even less effective in the case of non-glass slides. Thus, a set of 36 non-glass slides (each having the thickness of 2 mm) requires a space of only 180 cm$^3$.

Such a disproportionately large space occupied by the slide magazine is a very negative factor for an active user of the slides since he or she has to provide a significant space for the slide magazine each time the projector is in use.

On the other hand, should the slide magazine be even slightly inclined relative to a vertical position thereof (let alone an upside-down position of the slide magazine) the slides may fall out of the magazine. Obviously, this will cause problems for the user.

It has been suggested (e.g. German Offenlegungsschrift 1901091) to provide a slide magazine of separate parts connectable to one another. The slide magazine, further may include a number of elastic clamp carriers connectable to one another (e.g. German Offenlegungsschrift 2 145 997). These slide magazines only additionally complicate the process of installing, changing and displacing the slides. Moreover, such slide magazines require an especial step-by-step switch arrangement for the projector. These slide magazines, however, do not effectively solve the problem of saving the space occupied by the slide magazines.

The floor space required for the slide magazine may be saved, if one dispenses with the slide magazine per se and connects the slides directly one to another.

In German Offenlegungsschrift 2 031 484, there is described a slide package in which the slides are arranged in a line (i.e., row) one after another. Each slide is provided with a hole in an edge-corner portion of the slide. Thus, two adjacent slides are so arranged relative to each other that the respective holes of these slides are in allignment with each other and a pin is inserted through both holes so as to connect the adjacent slides to each other. The adjacent slides are swingable relative to each other. However, in order to project the thusly connected slides one has to have an entirely different (i.e., from a conventional type) projector which even when operated semiautomatically, can not demonstrate the conventional slides.

In German Pat. No. 1 296 820 it has been suggested to provide a slide with a slide frame. The slide frames are stacked together in a frame package so that each frame before demonstration by means of the projector is removed from and after demonstration inserted in the package. Each side surface of the frame is provided with parallel ribs bounding a plurality of inclined recesses. The ribs and the recesses of one slide frame interlock with the corresponding ribs and the recesses of the opposite side of the adjacent slide frame. Even such an arrangement of the slide frames stipulates a switch arrangement, different from that of the conventional projector, for changing the slides in a step-by-step manner. Such slide frames, due to the ribs projecting outwardly from the opposite side surfaces of the slide frame, can not be right away used in a conventional partitioned slide magazine. Moreover, a conventional projector, provided with a conventional arrangement for holding a slide frame, becomes useless for the slide frames having the above mentioned ribs. The manufacturing expenses of such slide frames are comparatively high, since die molds, for molding the inclined outer surface of the slide frame, have to be correspondingly inclined and separated. Obviously, such a requirement for manufacturing and installing the die molds make the process of molding the slide frames (i.e., which is already relatively expensive) even more expensive.

SUMMARY OF THE INVENTION

It is a general object of the present invention to avoid the disadvantages of the prior art slides and slide magazines.

More particularly, it is an object of the present invention to provide such a slide magazine which requires substantially no more space than a set of slide frames installed in the slide magazine.

Another object of the present invention is to prevent slide frames from falling out of a slide magazines when the latter is inclined relative to its normal upright position or even turned upside down.

Still another object of the present invention is to provide a new slide frame which can be stored in a new slide magazine according to the invention, but can also be used in conventional slide magazines and/or be used in conventional projectors.

A further object of the present invention is to provide a new slide frame and a new slide magazine without substantial increase in manufacturing expenses.

A still further object of the present invention is to provide such a slide frame which can be manufactured in a simple and inexpensive manner.

In pursuance of these objects and others which will become apparent hereinafter, one feature of the present invention resides in a slide frame adapted to be stored in a slide magazine having at least one engaging portion of a predetermined configuration, said slide frame comprising a central portion for receiving a slide, and an edge portion circumferentially embracing said central portion and having at least one section matingly complementing that of the engaging portion of the slide magazine so that when the slide frame is installed on the slide magazine, the slide frame is prevented from falling out of the magazine.

In accordance with another feature of the invention, a slide magazine for storing slide frames having an edge portion of a predetermined configuration, said slide magazine comprises a housing having a bottom surface provided with at least one elongated formation operative for holding a slide frame in the housing when the slide frame is installed in the slide magazine. The formation is shaped so as to matingly complement the configuration of the edge portion of the slide frame to thereby prevent the latter from falling out of the housing.

Thus, the upwardly open slide magazine (i.e. with the slide frames inside thereof) may be inclined or even turned upside down without the slide frames falling out of the magazine.

In accordance with still another feature of the invention, a slide magazine for storing slide frames, comprises an elongated support having an upper surface provided with a plurality of formations extending transversely of the elongation of said support. Each formation is operative for holding a respective slide frame when the latter is installed in the slide magazine. The distance between two adjacent formations as considered lengthwise of said support corresponding substantially to the thickness of slide frames to be installed in the slide magazine so that, when all said formations receive respective slide frames, the thus received slide frames form together a set of slide frames, having an overall length corresponding substantially to the length of said support so that the slide magazine requires substantially no more space than the set of slide frames in it.

Any side walls extending through the height of the prior art slide magazine for subdividing the enterior thereof into a plurality of slide compartments are eliminated in the case of the present invention. Only a very narrow air gap separates two adjacent slide frames when the latter are installed in the slide magazine. Thus, the relation of the space required for the slide frames to be stored in the slide magazine to the space required for the slide magazine for storing these slide frames is considerably inproved and is more effective as opposed to that of the prior art slide magazines.

In a further feature of the invention the support is provided with a plurality of side walls which extend slightly above the upper surface of the support. The side walls extend parallel to and equally spaced from each other, so as to form guiding passages between each two adjacent walls. The side walls are further provided with projections which extend substantially parallel to the upper surface of the support and in direction towards and into the respective guiding passages. Thus, each projection extends from the respective side wall towards a corresponding projection of the adjacent side wall. The two projections extending towards each other partially cover the respective guiding passage.

In accordance with one embodiment of the present invention, the slide frames are guided and retained in the slide magazine in the respective guiding passages. In this case, the slide frames are provided with engaging portions which correspond to and are adapted to engage the guiding passages of the slide magazine. Thus, the engaging portions may include a groove for guiding between the projections of two adjacent side walls and a shoulder portion guided along the unobstructed portion of the guiding passage and below the projections.

The dimension of the gap between the projections is substantially smaller than the thickness of the shoulder portion of the slide frame. Therefore any vertical displacement of the slide frames relative to the slide magazine is eliminated.

In accordance with another embodiment of the present invention the slide frames are guided and retained in the slide magazine on the respective side walls. In this case, the slide frames have a corresponding recess, embracing the projections of the side wall, and shoulders defining a passage therebetween for guiding the side wall per se.

In a still further feature of the invention the housing is provided with a rear wall connected to the support and extending substantially normal to the upper surface of the latter. In order to reliably install a slide frame on the slide magazine, one has to move the slide frame along the upper surface of the support all the way until the slide frame (i.e. a corresponding edge portion thereof) abuts the inner surface of the rear wall. The slide magazine is further provided with means for preventing unintentional movement of the slide frames, once they are installed on the slide magazine, relative to the slide magazine. Said preventing means include a biasing lever movable between a first position in which it obstructs the guiding passage and a second position, i.e. against the biasing force of the lever, so as to open the guiding passage. Thus, when the slide frame abuts with its one edge portion the inner surface of the rear wall, the biasing lever moves into the first position so as to prevent any movement of the slide frame within the guiding passage. In order to insert the slide frames into or withdraw the same from the slide magazine, a pressure, which exceeds the biasing force of the lever, has to be applied onto the slide frames under question so as to overcome said biasing force and move the lever into said second position in which the guiding passage is open. Once the pressure is released, the lever returns to its initial first (unstressed) position and the guiding passage is blocked.

The side walls may have a different configuration, such as T-shape, L-shape, dovetail or the like. A side wall may have two projections extending from the opposite sides of the side wall in the opposite directions, that is away from each other. These projections may be parallel or non-parallel to each other. The shapes of these two projections may be the same or be different from each other.

The inner surface of the rear wall is provided with ribs extending parallel to each other and normal to the upper surface of the support. The ribs are spaced from each other. Each rib extends in the same plane with the respective side wall. Such an arrangement renders it possible to obtain a precise position of the slide frames extending parallel to one another, when they are installed on the slide magazine, so that one edge portion of the slide frames engages the groove between the respective ribs on the inner surface of the rear wall.

Thus, in order to insure a compact position of the slide frames in the slide magazine, the smallest gap between the projections of any adjacent side walls is smaller than the maximum thickness of the slide frames to be accommodated on the slide magazine; however, the largest transverse dimension of the guiding passage between two adjacent side walls is only slightly bigger than the maximum thickness of the slide frames to thereby permit the slide frames only a limited movement (i.e. sliding) relative to the slide magazine.

In order to use the slide magazine according to the present invention with an automatic or semiautomatic projector, the latter has to be provided with a device for adjusting the indexing of the projector. Obviously, the size of the indexing steps in the case of the present invention has to be substantially smaller than that in the case of prior art slide magazines having a number of slide-containing compartments where the adjacent slide frames are separated from each other by the above-discussed clearance for the limited displacement of the slide frames plus the significant thickness of the side walls separating the adjacent compartments.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a top view of a portion of the slide magazine shown in FIG. 1;

FIG. 5 is a front view of the slide frame shown in FIG. 1;

FIG. 6 is a sectional view of the slide frame, taken along the line VI—VI in FIG. 5;

FIG. 7 is a front partial view of another embodiment of the slide frame;

FIG. 8 is a sectional partial view of the slide frame, along the line VIII—VIII in FIG. 7;

FIG. 9 is an enlarged view of a portion of the slide frame, designated by a circle X in FIG. 6;

FIG. 10A is a sectional partial view of still another embodiment of the slide frame shown in FIG. 5;

FIG. 10B is a sectional partial view of yet another embodiment of the slide frame shown in FIG. 5;

FIG. 10C is a sectional partial view of a further embodiment of the slide frame shown in FIG. 5; and FIG. 11 is a partial sectional view of still a further embodiment of the slide frame and the slide magazine according to the present invention.

DESCRIPTION OF THE PREFERRED EMBODIMENTS

Figure 1:
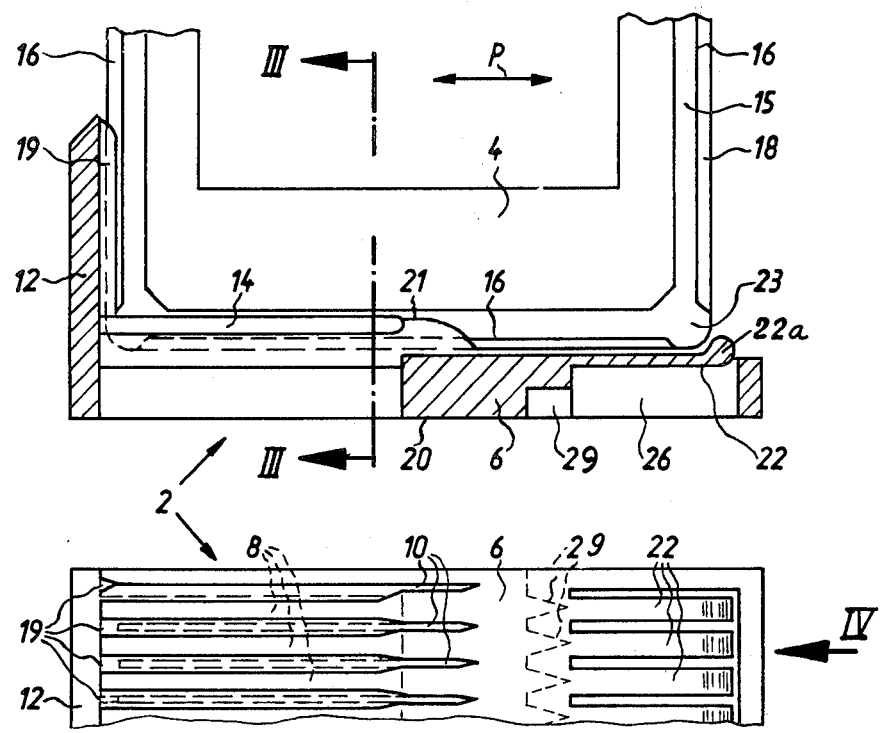
FIG. 1 is a sectional view of a slide magazine with a partial view of a slide frame installed in the slide magazine in accordance with the present invention.

Referring now to the drawings and first to the FIGS. 1-4 thereof, it may be seen that the reference numeral 2 designates a slide magazine for storing slide frames 4. The slide magazine 2 is provided with a bottom plate 6 which has a plurality of short side walls 10 which slightly project above the upper surface of the bottom plate 6. The side walls 10 extend parallel to and equally spaced from each other so as to bound a plurality of guiding passages 8. The slide magazine 2 is further provided with a rear wall 12 which extends substantially normal to the upper surface of the plate 6.

Figure 3:
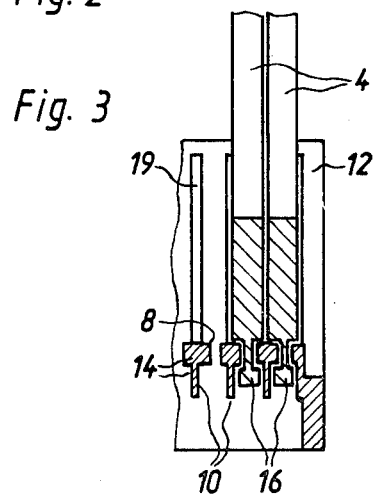
FIG. 3 is a sectional partial view taken along the line III—III in FIG. 1.

The side walls 10 may have a compound configuration such as that, for example, shown in FIG. 3. According to this embodiment, each side wall 10 has a formation 14 provided with two opposite shoulders which project from the respective opposite side surfaces of the side wall 10 towards and into the respective guiding passages 8. Two shoulders of the same formation 14 may have the same or different shape. The shoulders may be parallel or non-parallel relative to each other. The guiding passages 8 are operative to receive respective slide frames 4, namely respective edge portions 16 thereof.

Each slide frame 4 (see FIGS. 1, 3 and 7-11) has a central portion 4a for receiving a slide and the edge portion 16 which circumferentially embraces the central portion 4a. In general, the edge portion has engaging portions of a predetermined configuration (see FIGS. 6 and 8-11) for matingly complementing the respective side walls 10 when the slide frames 4 slide in or out of the slide magazine 2. Different shapes of the engaging portion 16 of the slide frame 4 will be described in greater detail below.

Figure 4:
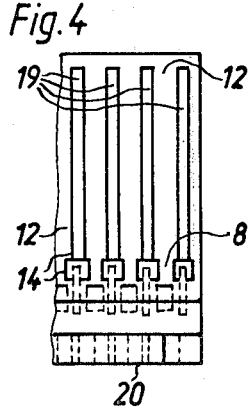
FIG. 4 is a partial view of the slide magazine as seen in the direction of an arrow IV in FIG. 2.

An inner surface of the rear wall 12 is provided with parallel ribs 19 extending normally to the upper surface of the bottom plate 6 (see FIG. 4). Each rib 19 extends in the same vertical plane as the respective side wall 10. Thus, a gap is developed between each two adjacent ribs 19, and operative for receiving a corresponding edge portion 16 of the respective slide frame upon its movement along the bottom plate 6 towards the rear wall 12. The respective side surfaces of the ribs 10, bounding the above-mentioned gap, hold the slide frame 4 in its vertical position in the slide magazine 2. Thus, the slide frame 4 is prevented from inclining relative to the vertical position thereof. On the other hand, the ribs 19 revent the slide frame 4 from being overstressed.

The distance between two adjacent side walls 10 on the bottom plates 6, and correspondingly between two respective adjacent ribs 19 on the rear wall 12, corresponds substantially to or only slightly exceeds the maximum thickness of the slide frames 4.

Thus, the slide frames 4, when installed in the slide magazine, are arranged very close to each other (see FIG. 3), namely two adjacent frame 4 are separated from each other only by a very narrow air gap. When installed on the slide magazine 2, the slide frames 4 form together a set of slide frames, having an overall length corresponding substantially to or only slightly smaller than the length of the bottom plate 2. Thus, the slide magazine requires substantially no more space than the set of slide frames in it.

Each guiding passage 8 is open downwardly towards a lower surface 20 of the slide magazine 2. The slide magazine may be of synthetic plastic material and may be manufactured as one piece by way of a simple injection die-casting process. The side walls 10 are formed to be connected at one end thereof to the rear wall 12 and at another end thereof to the bottom plate 6. The other end of the side walls 10 is rounded so as to facilitate the process of installing the slide frames 4 in the slide magazine 2.

The bottom plate 6 is further provided, preferably formed during the injection die-casting process, with biased catch elements 22. Each catch element 22 is in alignment with the respective guiding passage 8. The catch elements 22 are operative for holding the respective slide frames 4 in the respective guiding passages 8. Each slide frame 4 is provided with rounded corner portions 23. Thus, when the slide frame 4 moves towards the rear wall 12 past an engaging portion 22a of the catch element 22, the engaging portion 22a snaps behind the respective corner portion 23 of the slide frame 4.

The slide frames 4 may move (i.e. slide) relative to the slide magazine 2 in a direction depicted by an arrow P (see FIG. 1). Such movement may be intentional (i.e. installing the slide frames in or removing the same from the slide magazine 2) or unintentional, for example, due to the force of gravity, should the slide magazine be correspondingly inclined. Thus, the biasing force of the catch elements 22 prevents the slide frames 4 from the undesired (i.e. unintentional) sliding relative to the slide magazine 2. When the slide frames 4 are intentionally removed from the slide magazine 2, the respective catch element 22 moves downwardly into a recess 26 so that the engaging portion 22a of the element 22 becomes flash with the upper surface of the bottom plate 6. In the recess 26, the slide magazine 2 is provided with a rack having indexing teeth 29. The rack is used for operatively connecting the slide magazine 2 to a projector for demonstrating the slides. The projector is known per se and, therefore, does not require a detailed discussion or illustration.

The slide magazine 2 may be used as a projector magazine so that a device for changing slides catches a slide frame 4 at a free upper portion thereof in order to remove the slide frame from the slide magazine 2 in direction of the arrow P. Since the slide frames 4 are located in the slide magazine 2 very close to one another, the indexing of the movement of the slide changing device has to be correspondingly adjusted, i.e. reduced as opposed to that in the conventional slide magazine. This can be obtained by a corresponding arrangement for operating the projector with an adjustable indexing.

FIGS. 5–11 illustrate different embodiments of the slide frames 4 which are to be stored in the above described slide magazine 2 shown in FIG. 1–4.

The slide frames 4 differ from one another only by the shape of the edge portion 16. For one and the same slide frame the edge portion thereof may be the same along the entire length of the edge of the slide frame 4. Therefore, an operator may install the slide frames 4 by directing any of the edges (e.g. four in the case of the embodiment shown in FIG. 5) in the respective guiding passage 8 of the slide magazine 2. However, it is also possible to vary the shape of the edge portion even for one and the same slide frame. In order to install such a slide frame on the slide magazine 2 the operator has to direct the respective edge portion (which matingly complements the configuration of the side wall 10 of the slide magazine 2) into the guiding passage 8.

Such an arrangement may be done, if it is required or desirable to keep the slide frames 4 in a certain position (e.g. with the slide upside down) in the slide magazine.

The edge portions 16 of the slide frame 4 shown in FIGS. 5 and 6 have a T-shaped configuration. The edge portion 16 includes two inner shoulders 27 and 27' located at the respective side surfaces of the slide frame 4, two outer shoulders 27a and 27a' of an outer formation 18 and two opposite grooves 15 bounded at the respective side surfaces of the slide frame 4 by the shoulders 27, 27a and 27' and 27a', respectively. Thus, when such a slide frame 4 is installed on the slide magazine 2, the grooves 15 are guided along the respective shoulders of the formation 14 of the respective two adjacent side walls 10, whereas the outer formation 18 is received in the guiding passage 8 between the side walls 10 and below the respective formation 14. The grooves 15 on the opposite side surfaces of the slide frame 4 are parallel to each other and equally spaced from an outer periphery of the slide frame. The length of each groove 15 is equal to each other. The thickness of the corner portion 23 is equal to that of the wall between the grooves 15. The grooves 15 are open to the corner portion 23 so that the process of installing the slide frame 4 in the guiding passage 8 between the adjacent side walls 10 is considerably facilitated.

FIG. 9 is an enlarged view of the embodiment shown in FIG. 6. The outer formation 18 has the thickness a which exceeds the thickness b of the wall between the grooves 15, and is smaller than the thickness c (i.e. the maximum thickness of the slide frame 4.) Thus, the distance between the adjacent side walls 10 corresponds to the thickness c of the slide frame 4, whereas the distance between the opposite shoulders of the two adjacent formations 14 corresponds to the thickness c of the wall between the grooves 15. Obviously, the left side of the edge portion 16 is symmetrical to the right side thereof.

FIGS. 7 and 8 illustrate another slide froma 4' having an edge portion 16'. The left side of the edge portion 16' is non-symmetrical to the right side thereof.

Thus, the grooves 15a and 15b are spaced from the outer periphery of the slide frame 4' by the formations 18a and 18b, respectively. The length of these formations is not equal to each other. Moreover, the length of the grooves 15a and 15b may be also different. Obviously, such a slide frame 4 may be installed on the slide magazine 2 only after the slide frame is correspondingly positioned relative to the guiding passage 8.

FIG. 10A shows an embodiment of the slide frame 4 which has the edge portion 16 formed with only one groove 15. In this case, the edge portion has a L-shaped configuration.

FIG. 10B shows an embodiment of the slide frame 4 which has the edge portion 16 formed with a dovetail configuration.

FIG. 10C shows an embodiment of the slide frame 4 which has the edge portion 16 formed with two symmetrical durved grooves 15.

The embodiments of the slide frame shown in FIGS. 5 to 10 have at least one common feature, i.e. the slide frames, when installed on the slide magazine 2, are guided along the respective guiding passages 8 bonded by adjacent side walls 10. (see FIG. 3).

FIG. 11 shows another embodiment of the slide frame 4a which is different from those illustrated in FIGS. 5 to 10. The slide frame 4a has an edge portin 16a which has at both sides of the slide frame 4a the same planar configuration. However, the outer peripheral surface of the slide frame 4a is provided with a recess 15a extending from the outer periphery of the slide frame 4a inwardly. The recess 15a has a portion 15a' of a relatively large cross-section, and a portion 15" of a relatively small cross-section. The portion 15a" of the recess 15a is bounded by projections 16a' and 16a" extending parallel towards each other. Thus, the slide frame 4a is guided directly on the side wall 10 (i.e. received in the portion 15a" between the projections 16a' and 16a") and the formation 14 received in the portion 15a' of the recess 15a.

It is to be understood that the recess 15a does not extend uninterruptedly along the entire length of the slide frame periphery. In fact, the recess 15a may have one or more openings outwardly thereof so as to install the slide frame 4a on the respective side wall 10 through side on opening.

It is possible in accordance with the present invention to substitute the bottom plate 6 by another support, e.g.

a carrying ring provided with the elongated projections (i.e. side walls) extending radially inwardly relative to the ring. The shape of these projections should matingly complement the shape of the edge portion of the respective slide frames. The slide magazine may have an elongated or a circular cross-section.

It will be understood that each of the elements described above, or two or more together, may also find a useful application in other types of slide frames and a slide magazine for storing such slide frames, differing from the types described above.

While the invention has been illustrated and described as embodied in a slide frames and a slide magazine for storing such slide frames it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A slide frame adapted to be stored in a slide magazine having at least one undercut engaging portion of a predetermined configuration, said slide frame comprising a central portion for receiving a slide; and an edge portion circumferentially embracing said central portion and having at least one undercut section matingly complementing that of the undercut engaging portion of the slide magazine so that, when the slide frame is installed on the slide magazine, the slide frame is prevented from falling out of the magazine.

2. A frame as defined in claim 1, wherein said edge portion has a circumferential end face defining a periphery surface of the frame, said one section being provided on said end face.

3. A frame as defined in claim 2, wherein said one section includes a groove on said end face having an upper end open outwardly away from said end face and a lower open end directed away from said upper open end, and an outer recess in said edge portion, said recess communicating with said groove through said lower open end.

4. A frame as defined in claim 1, wherein said edge portion has two opposite sides corresponding to opposite sides of the frame, said one section being provided at least at one side of the edge portion.

5. A frame as defined in claim 4, wherein said edge portion includes a first portin of a first thickness and extending substantially adjacent to said central portin of the frame, and a second portion of a second thickness substantially smaller than said first thickness, said second portion being connected to and projecting from said first portion so as to bound a groove constituting said one section.

6. A frame as defined in claim 5, wherein said one section further includes a third portion of said edge portion, of a third thickness exceeding said second thickness, said third portion being connected to and projecting from said second portion.

7. A frame as defined in claim 6, wherein said one section extends circumferentially along the entire length of said edge portion.

8. A frame as defined in claim 7, wherein said groove is substantially uninterrupted along the entire length of said edge portion, said third portion being at least once interrupted so as to at least once outwardly open said groove.

9. A frame as defined in claim 8, wherein said edge portion has at least four edges, each two adjacent edges extending substantially transversely to each other.

10. A frame as defined in claim 9, wherein said third portion is interrupted in the region of at least one corner bounded by two adjacent edges.

11. A frame as defined in claim 4, wherein said one section is provided at both sides of the edge portion.

12. A frame as defined in claim 1, wherein said one section has a portion of a substantially T-shaped cross-section.

13. A frame as defined in claim 1, wherein said one section has a portion of a substantially dovetail cross-section.

14. A frame as defined in claim 1, wherein said one section has a portion of a substantially L-shaped cross-section.

15. A frame as defined in claim 11, wherein said frame is provided with one of said one sections on both sides and said one sections are symmetrical relative to each other.

16. A frame as defined in claim 11, wherein said frame is provided on both sides with one of said one sections and the same are non-symmetrical relative to each other.

17. A frame as defined in claim 16, wherein one of said one sections at one side of the frame includes a first groove spaced from an end face of said edge portion by a first distance, the other of said one sections at the other side of the frame including a second groove spaced from the end face of said edge portion by a second distance different from said first distance.

18. A slide magazine for storing slide frames having an edge portion of a predetermined undercut configuration, said slide magazine comprising an elongated housing having at least two adjoining open longitudinal sides and a bottom surface provided with at least one elongated undercut formation operative for holding a slide frame in the housing when the slide frame is installed in the slide magazine, said undercut formation being shaped so as to matingly complement the configuration of the undercut edge portion of the slide frame to thereby prevent the latter from falling out of the housing.

19. A magazine as defined in claim 18, wherein said formation has a T-shaped cross-section.

20. A magazine as defined in claim 18, wherein said bottom surface is provided with a plurality of said elongated formations extending parallel to and spaced from each other so as to bound a guiding passage between each two adjacent formations for receiving therein a respective slide frame.

21. A magazine as defined in claim 20, wherein at least one of said two adjacent formations includes a portion projecting inside said guiding passage so as to partially overlap the latter and engage an edge portion of a slide frame to be installed in said guiding passage.

22. A magazine as defined in claim 18, wherein said formation has a dovetail cross-section.

23. A magazine as defined in claim 21, wherein both of said two adjacent formations include said portions projecting inside said guiding passage and towards each other.

24. A magazine as defined in claim 21, wherein said one formation is provided at both sides thereof with at least one of said portions extending from the respective sides of said one formation towards the respective adjacent formations.

25. A magazine as defined in claim 24, wherein said portions at both sides of said one formation are parallel to each other.

26. A magazine as defined in claim 24, wherein said portions at both sides of said one formations are non-parallel to each other.

27. A magazine as defined in claim 21, wherein said portion is spaced from the bottom surface by a distance substantially corresponding to the length of a projection of a slide frame to be accommodated in said housing.

28. A magazine as defined in claim 23, wherein said opposite portions on the respective two adjacent formations bound between each other a gap slightly exceeding the thickness of the corresponding portion of a slide frame to be accommodated in said housing.

29. A magazine as defined in claim 18, wherein said formation is a lamell plate projecting above the bottom surface of said housing by a distance corresponding to an edge portion of a slide frame to be accommodated on said housing.

30. A magazine as defined in claim 20, wherein said housing is further provided with a rear wall extending substantially normal to said bottom surface, said guiding passages being closed from one side thereof by said rear wall, so that said slide frame, when installed in said housing, abuts an inner face of said rear wall.

31. A magazine as defined in claim 30, wherein said inner surface of said rear wall is provided with a plurality of ribs extending parallel to and spaced from each other so as to form a vertical passage substantially corresponding to and being in alignment with the respective guiding passages on said bottom surface.

32. A magazine as defined in claim 18, and further comprising means for preventing a slide frame, when the latter is installed on said housing, from unintentional sliding relative to said housing.

33. A magazine as defined in claim 32, wherein said preventing means include a biasing element movable between a first position in which the latter obstructs said guiding passage so as to prevent the slide frame when the latter is in said guiding passage, from sliding out of the housing and a second position against the biasing force of said element to thereby open said guiding passage so as to permit the slide frame to move relative to said housing.

34. A magazine as defined in claim 18, wherein said elongated formation has a rounded portion operative for facilitating the slide frame to be installed on said housing.

35. A slide magazine for storing slide frames, comprising an elongated support having an upper surface provided with a plurality of undercut formations extending transversely of the elongation of said support and each operative for holding a respective slide frame when the latter is installed in the slide magazine, the distance between two successive ajacent undercut formations as considered lengthwise of said support corresponding substantially to the thickness of slide frames to be installed in the slide magazine so that, when all said formations receive respective slide frames, the thus received slide frames form together a set of slide frames having an overall length corresponding substantially to the length of said support so that the slide magazine requires substantially no more space than the set of slide frames in it.

36. A slide magazine for storing slide frames having an edge portion of a predetermined undercut configuration, said slide magazine comprising an elongated housing having a plurality of longitudinal sides at least one of which is open and at least one other of which has an inwardly directed surface provided with at least one elongated undercut formation operative for holding a slide frame in the housing when the slide frame is installed in the slide magazine through said at least one open side, said undercut formation being shaped so as to matingly complement the configuration of the undercut edge portion of the slide frame to thereby prevent the latter from falling out of the housing.

* * * * *